United States Patent [19]
Corning

[11] 3,967,301
[45] June 29, 1976

[54] PHOTOGRAPHER'S COPY STAND

[76] Inventor: Lee M. Corning, c/o Corning Photography 1012 Washington St., San Carlos, Calif. 94070

[22] Filed: Nov. 4, 1974

[21] Appl. No.: 520,276

[52] U.S. Cl. .............................. 354/292; 240/1.3; 240/2 C
[51] Int. Cl.² ......................................... G03B 15/00
[58] Field of Search ................... 354/290, 291, 292; 240/1.3, 2 C

[56] References Cited
UNITED STATES PATENTS

| | | | |
|---|---|---|---|
| 1,799,866 | 4/1931 | Roth | 354/290 |
| 2,186,533 | 1/1940 | Lange | 354/290 |
| 2,827,553 | 3/1958 | Riches | 354/290 |
| 3,039,357 | 6/1962 | Eagle | 354/291 |
| 3,128,688 | 4/1964 | Coda | 354/291 |

*Primary Examiner*—John Gonzales
*Attorney, Agent, or Firm*—Julian Caplan

[57] ABSTRACT

To provide a neutral background or a background of desired color, a stand is provided having a pedestal for the object being photographed and a hanger for a sheet of translucent plastic. Both pedestal and hanger are adjustable relative to a base both in elevation and in horizontal distance from the base. The plastic sheet is apertured for extension of the arm which supports the pedestal. Lamps are mounted on the base to illuminate the back of the plastic sheet and filters may be used with these lamps. The bottom of the sheet may be curved forwardly along the floor to provide a similar background when the camera is sighted from above the object.

4 Claims, 2 Drawing Figures

PHOTOGRAPHER'S COPY STAND

This invention relates to a new and improved photographer's copy stand which has for its principal purpose to provide adjustable supports for a pedestal on which the object to be photographed rests and also for a sheet of plastic material which is positioned behind the object in the line of sight of the camera. The plastic sheet is preferably illuminated from behind either with a white light or a light having appropriate color filter. The plastic sheet obscures all background, including the stand, from the picture of the object.

The copy stand may be used either for color or black and white photography.

Accordingly, it is a principal object of the present invention to provide a neutral background of desired color with no need to touch up the negative to remove background from the picture.

Another object of the invention is to conceal the support for the object so that it seems to stand alone in space. Different size pedestals are provided so that the base of the object occupies the entire pedestal and the pedestal does not appear in the picture. The backdrop plastic sheet is apertured so that the support arm for the pedestal projects through the plastic sheet and the object conceals the arm and the aperture in the picture taken.

Another feature of the invention is the fact that the background sheet is flexible so that when the camera is viewing the object from above the lower end of the plastic sheet may be curved forwardly to obscure the floor as well as the legs of the base of the stand.

Other objects of the invention are the fact that it is readily transportable, easily adjustable in many different positions and adaptable to a wide variety of conditions of photography.

The stand of the present invention has a base 11 which rests on the floor or ground. To provide stability there are forwardly-outwardly diverging legs 12 connected by a central connecting portion 13. From the middle of the connecting portion 13 there extends a lower socket 14 vertically aligned and reinforced by a fin 16 at the back. Preferably the socket 14 is of square tubing as are the other sockets hereinafter described. This construction prevents the various members from turning relative to each other and makes adjustment more simple. Projecting out from socket 14 is lower tube 17. Vertically slidable along tube 17 is a slide 18 which likewise has a rigidifying fin 19. The position of slide 18 on lower tube 17 is controlled by set screw 21.

On the upper end of slide 18 is a bracket 26 and laterally offset from bracket 26 is upper vertical socket 27 preferably of smaller size than socket 14. Set screw 28 associated with socket 27 controls the height of the upper vertical rod 36 which slides therein. Fixed to the upper end of slide 18 is lower horizontal socket 31 which extends forward and the position of lower horizontal rod 32 in socket 31 is controlled by set screw 29. A set of different sized pedestals 33 is provided, the pedestals being of any desired size and shape depending upon the object 53 being photographed. Preferably, the pedestal 33 is slightly smaller than the base of the object so that the object conceals it in the picture. Pedestal 33 has a sleeve 34 fixed to its bottom which projects rearwardly and slides over rod 32. Different pedestals can be slipped on to the end of the rod 32 depending upon the work being done.

Other objects of the present invention will become apparent upon reading the following specification and referring to the accompanying drawings in which similar characters of reference represent corresponding parts in each of the several views.

Figures 1, 2:
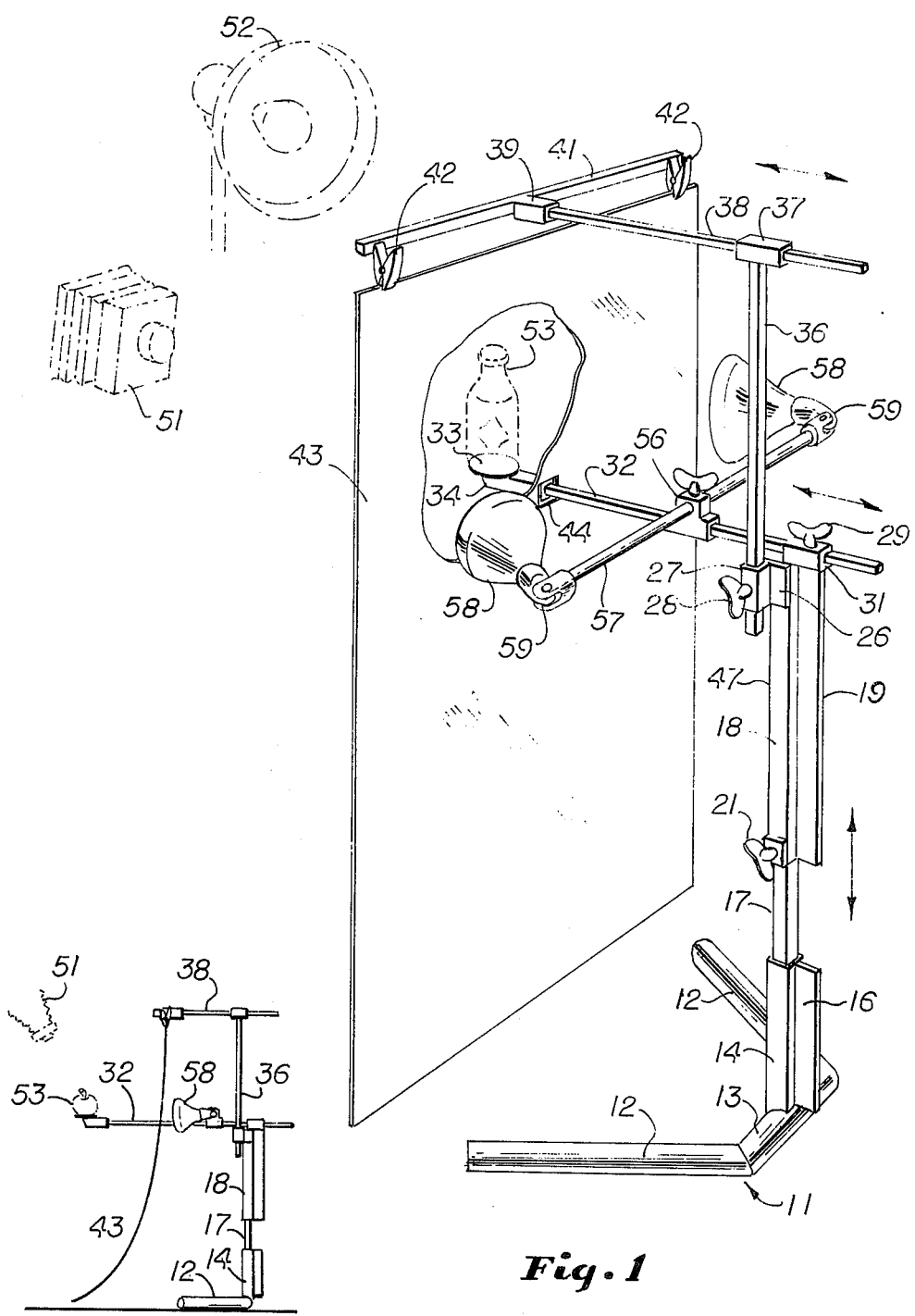
FIG. 1 is a perspective view, partially schematic and partially broken away of my invention.
FIG. 2 is a side elevation showing an alternate use of the stand.

Upper vertical rod 36 slides in socket 27 and carries on its upper end upper horizontal socket 37. Slidable in socket 37 is upper horizontal rod 38. Fixed to the forward end of rod 38 by means of socket 39 is horizontally positioned backdrop support rod 41. Fixed to rod 41 in at least two positions are clips 42 which engage the upper edge of a translucent plastic backdrop sheet 43. An aperture 44 is formed in sheet 43 for rod 32 or sleeve 34.

Suitably positioned, preferably on rod 32, are backlights 58 attached by means of supports 59 to horizontal rod 57 attached to rod 32 by adjustable clamp 56. The backlights 58 illuminate the back of translucent sheet 43 so that to the camera the sheet 43 appears to be a neutral color and all objects behind the sheet 43 are obscured. The backlight 58 may be provided with various color filters as required. Further, colored filter paper may be clipped to the back of backdrop 43 at various positions to provide a variegated appearance to the sheet 43 when viewed by the camera.

The camera 51 views the object 53 from a position forwardly of base 11 and the object 53 is illuminated by one or more conventional floodlights 52. To the camera, the object 53 stands out in space, the pedestal 33 and outer sleeve 34 being concealed by the direction from which the object is viewed.

When it is desired to position the camera 51 above the object 53, the lower edge of the sheet 43 may be curved forwardly all along the floor thereby concealing the floor from the picture taken. See FIG. 2.

A principal feature of the invention is the wide adjustability provided by the stand. Thus the pedestal 33 is adjustable in elevation by moving the slide 18 along the lower tube 17. Further, the position of the object 53 from the backdrop 43 is adjusted by sliding the lower horizontal rod 32 in socket 31. The same effect may be achieved by sliding rod 38 in socket 37. Generally speaking, the rods 32 and 38 are the same distance apart so long as a single aperture 44 is used located a specific distance from the upper edge of sheet 43. However, the position of aperture 44 may be varied by cutting different holes in sheet 43 or using different sheets. In this case, the rod 36 may be adjusted relative to socket 27.

By the use of square tubing and square rods the alignment of the various objects is assured, namely, that rod 32 always projects forwardly perpendicular to the plane of sheet 43.

What is claimed is:

1. A photographer's stand comprising a base, a lower member extending vertically upward from said base, a slide vertically adjustably positioned on said lower member, a horizontal first socket and a vertical second socket on said slide, a lower horizontal rod horizontally adjustably positioned in said first socket, a pedestal for an object to be photographed on the outer end of said lower rod, a sheet apertured for projection of said lower horizontal rod, a vertical rod in said second socket, a third socket on the upper end of said vertical rod, an upper horizontal rod horizontally adjustably positioned in said third socket, and a horizontal support rod on the outer end of and disposed transverse to said upper horizontal rod, and support means on said support rod for supporting the upper edge of said sheet.

2. A stand according to claim 1 in which said pedestal is detachable from and replaceable on said outer end of said lower horizontal rod for replacement by a pedestal of different shape.

3. A stand according to claim 1 in which said sheet is of translucent plastic.

4. A stand according to claim 3 which further comprises a lamp mounted on said lower horizontal rod directed to illuminate the back of said translucent sheet.

\* \* \* \* \*